R. M. MERRIMAN.
METHOD OF MAKING FOUR PLY LOCK CORD TIRES.
APPLICATION FILED DEC. 30, 1916.

1,221,887.

Patented Apr. 10, 1917.
3 SHEETS—SHEET 1.

Inventor
R. M. Merriman.

By
Attorneys

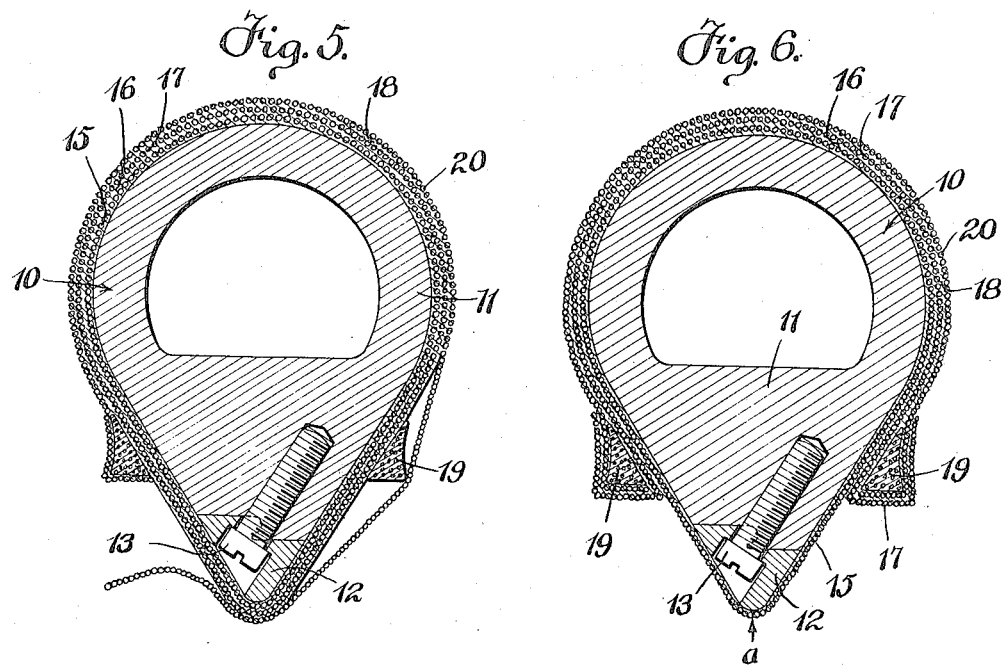
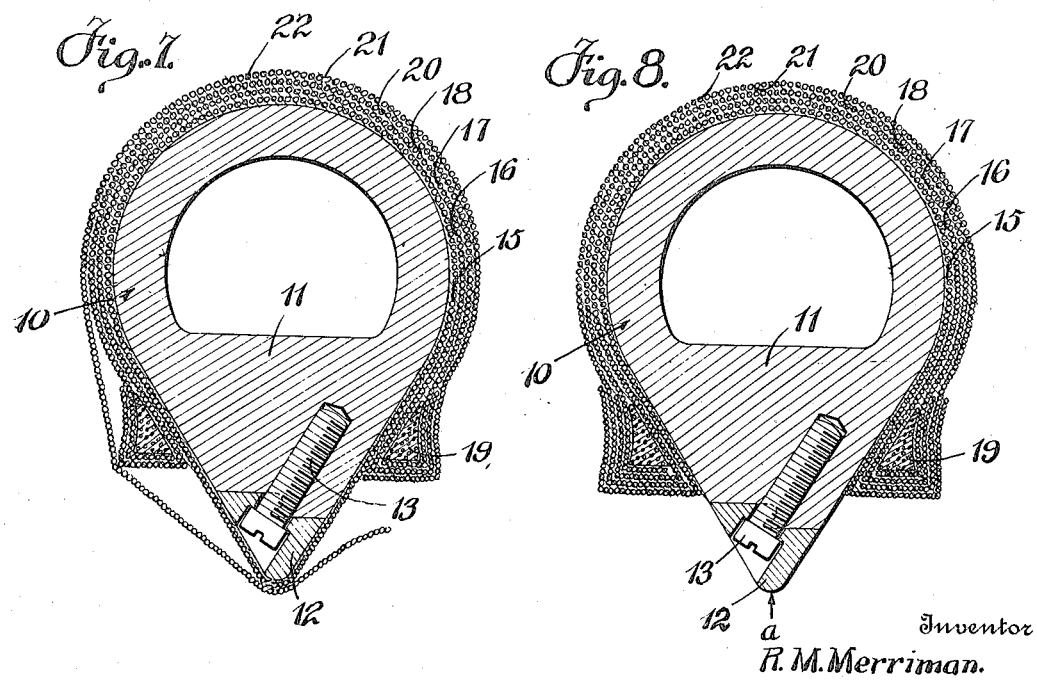

R. M. MERRIMAN.
METHOD OF MAKING FOUR PLY LOCK CORD TIRES.
APPLICATION FILED DEC. 30, 1916.

1,221,887.

Patented Apr. 10, 1917.
3 SHEETS—SHEET 3.

Inventor
R.M. Merriman.

By [signature], Attorneys

UNITED STATES PATENT OFFICE.

ROBERT M. MERRIMAN, OF AKRON, OHIO.

METHOD OF MAKING FOUR-PLY LOCK-CORD TIRES.

1,221,887.  Specification of Letters Patent.  Patented Apr. 10, 1917.

Application filed December 30, 1916.  Serial No. 139,885.

*To all whom it may concern:*

Be it known that I, ROBERT M. MERRIMAN, a citizen of the United States, residing at Akron, in the county of Summit and State of Ohio, have invented certain new and useful Improvements in Methods of Making Four-Ply Lock-Cord Tires, of which the following is a specification.

My present invention relates to new and useful improvements in cord tires and more particularly to a novel and improved method of constructing tires of such character, the primary object of my invention being the provision of a method or process for constructing tires from cord and rubber in such a manner that the cords will be positively locked to each other, both as regards the cords of each ply in the tire, as well as the cords of adjacent plies.

A still further object of my invention resides in a new method of winding the cord plies about a specially shaped and proportioned core and separately severing the strands of the various plies in certain order to facilitate the formation of the bead portions of the tire.

Another object of my invention resides in a new and improved method of forming the bead portions of the tire and embedding the beads proper therein so that the various plies of cord will securely lock the beads in place and will, in turn, be locked to the beads.

With these and other objects in view, my invention will be more fully described, illustrated in the accompanying drawings, and then specifically pointed out in the claims which are attached to and form a part of this application.

In the drawings:

Figures 1 to 9 inclusive are radial sectional views taken through the core, showing successive steps in the construction of a tire thereon;

Corresponding and like parts are referred to in the following description and indicated in all the views of the drawings by the same reference characters.

Figure 1:
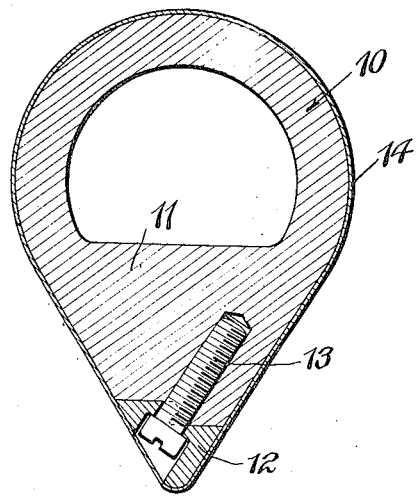
Figure 2:
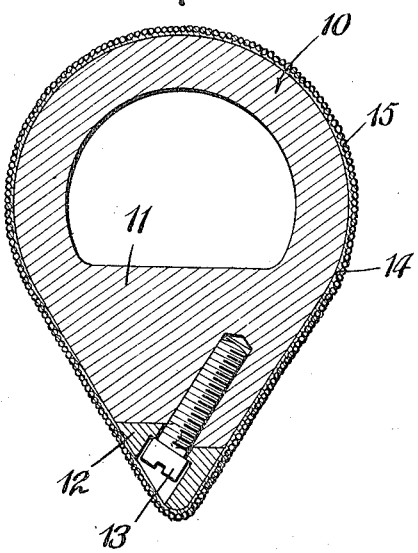
Figure 3:
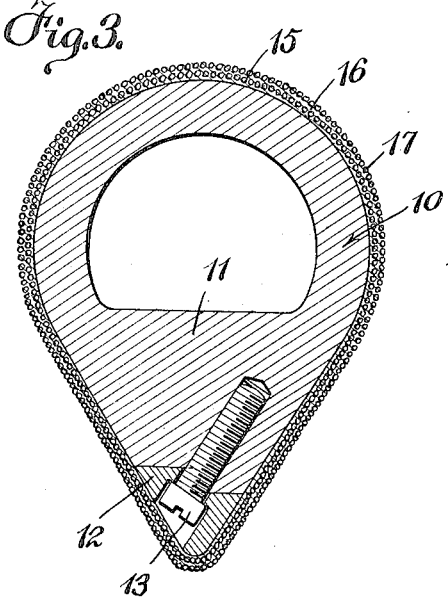

The mechanical features of construction of the tire illustrated in this case are fully covered in a copending application filed by me Dec. 30, 1916, and bearing the Serial No. 139,886, this case relating solely to the method or successive steps employed in forming the tire. The tire, as will be later apparent, is built up or shaped upon a particular form of collapsible core designed especially for this use and fully described in a still further copending application filed by me December 30, 1916 and bearing the Serial No. 139,884. For this reason, the present drawings illustrate the core only to such an extent as is necessary to bring out the method of manufacturing the tire.

In each of Figs. 1 to 9 inclusive, the core 10 is shown in radial section and this core includes a plurality of body members 11 which, when assembled, form an outer body or rim and which are connected in assembled position by a removable inner locking ring 12 to which the sections are secured by screws or bolts 13. Removal of the bolts and locking ring permits successive removal of the outer sections 11 from the partially finished tire built up upon the core. As many forms of cores of this type are well known in the art, it is thought that the present disclosure is sufficient for the purposes of this case.

After assembling the core, the first step in the construction of the tire consists in providing the core with a thin coating 14 of cement. After this has been done, an inner cord ply 15 is wound helically about the core at an angle of substantially 45° to the radial throughout the entire length of the core. The cord employed is relatively small or fine and the adjacent strands engage closely against each other, care being taken to compress the strands snugly against each other along the inner portion of the core so that the uncompressed portions of the strands along the tread of the core will engage against each other.

Figure 4:
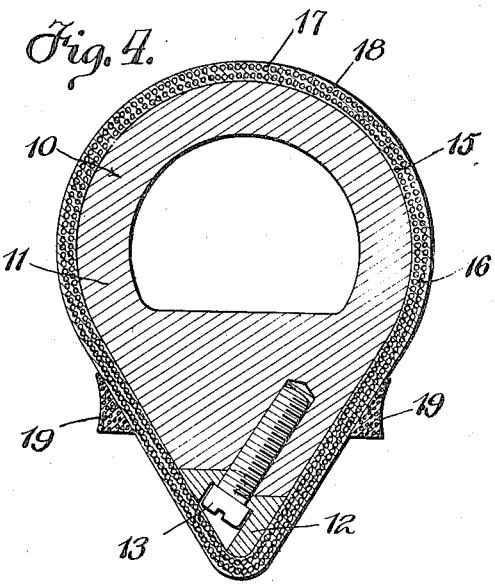
Figure 9:
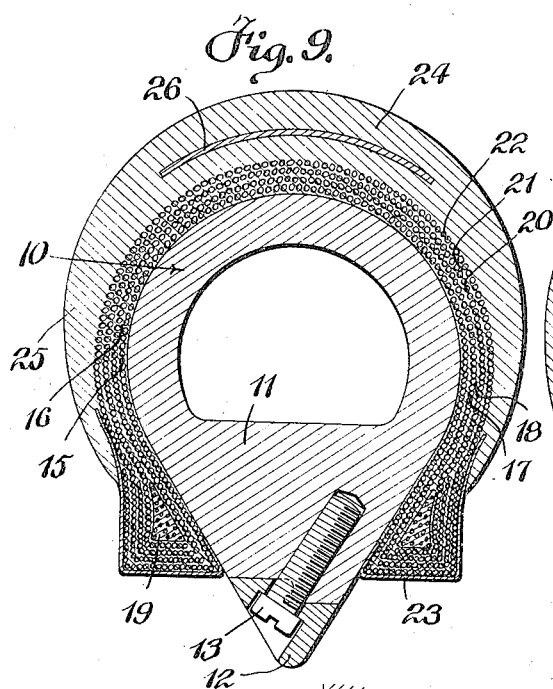
Figure 10:
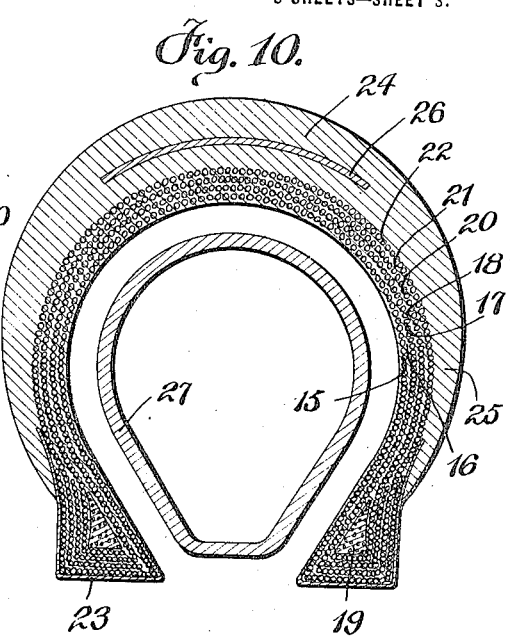
Fig. 10 is a corresponding view, showing the manner of applying a partially finished tire to an air bag employed during the curing of the tire.
Figure 11:
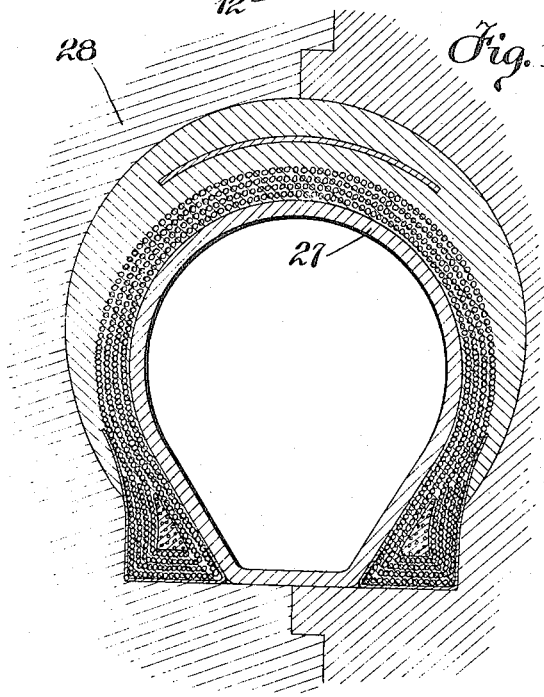
Fig. 11 is a corresponding section taken through the tire, air bag and mold employed in curing the tire.

After this cord ply has been wound upon the core a frictioning ply of gum rubber 16 is laid over the cord ply and a second cord ply 17 is wound about the core. This second ply is wound and compressed in the same manner as the first, but, while it extends at an angle of substantially 45° to the radial, it is wound reversely to the first ply so that the cords of the two plies will cross each other at an angle of substantially 90°. A second frictioning ply of gum rubber 18 is then laid over the second cord ply in the same manner as the first frictioning ply 16. Suitable beads 19 are then positioned against the sides of the partially built up tire, resting against the second cord ply, as shown in Fig. 4, and located slightly outside of the juncture of the body member proper of the core and its locking ring 12. The tire illustrated in the present case is a straight side tire and beads of the proper cross sectional shape, for this type of tire, are shown. These beads may be of any desired construction and preferably include a plurality of fine piano wires which are molded into the beads in the usual manner.

After the beads have been positioned, a third ply of cord 20 wound and compressed in the same manner as the preceding plies, with its strands extending parallel to the strands of the first ply and, consequently, at substantially right angles to the strands of the second ply, is applied. As shown at the right of Fig. 5, the beads space a portion of this third ply of cord from the second ply and after it has been wound upon the core its various strands are severed along circumferential lines part way between the base portions of the beads and the inner pointed side of the core, the exact lines of severance being such that when the resultant terminals of the strands making up this ply are molded in against the outer faces of the beads and the inner base portions thereof, as shown at the left of Fig. 5, they will abut against the second cord ply.

The strands making up the second cord ply 17 are then severed along the inner edge of the core at the line indicated by the arrow at $a$ and the free end portions of the strands are brought upwardly across the base portions of the beads and along the outer side walls of the beads to overlap the downwardly and inwardly directed terminals of the third ply, the ends of the second ply terminating at substantially the level of the outer or upper edges of the beads and, as explained in the previously referred to application upon the core construction, the core is so shaped and proportioned that the severing of the ply 17 along the line indicated will leave the ends of the strands the proper length for this purpose, thereby avoiding further trimming.

Another frictioning ply of gum rubber 21 is then laid over the partially built up tire covering the third ply and preferably extending about the bead portions of the tire and a fourth ply of cord 22, the strands of which extend reversely to the strands of the third ply and parallel to those of the second ply, is wound and compressed about the partially built up tire and the core therein. This fourth ply is doubly severed at either side of the edge of the locking ring along lines substantially corresponding to the lines of severance of the third ply and the resultant free end portions of its strands are formed inwardly against the outer faces of the beads and against the base portions thereof, as clearly indicated at the right in Fig. 7.

The first ply of cord is then severed along the line $a$ in the same manner that the second ply was severed and the ends of its strands are brought outwardly across the base portions of the beads and upwardly along the outer side faces thereof, as clearly shown in Fig. 8.

From the foregoing description, it will be apparent that the free ends of the strands of each ply overlap and extend in an opposite direction across the free ends of the strands of an adjacent ply and that the beads are firmly embedded and locked between the various plies. Furthermore, by this construction, there are two cord plies disposed against the inner faces of the beads and four thicknesses of cord across the base and outer side portions of the beads. This overlapping or interlocking of the various plies makes it impossible for the cords to loosen or separate and, consequently, renders it impossible for the beads to break away from the body of the tire.

With the tire thus far built up, the bead portions are pried somewhat from the core in order that the inner edge portions of chafing strips 23 of suitable fabric may be inserted between the bead portions and sides of the core. The inner edges of these chafing strips preferably extend up the inner faces of the sides of the tire to substantially the level of the base portions of the beads proper, as clearly shown in Fig. 9, and the outer edge portions of the chafing strips are brought outwardly across the bases of the beads and up the outer side walls thereof to extend an appreciable distance into the side walls of the tire when the latter are applied. After the chafing strips have been applied, the tread 24 and side walls 25 are built upon the tire thus far constructed, a breaker strip 26 being preferably embedded in the tread in the usual manner.

Figure 12:
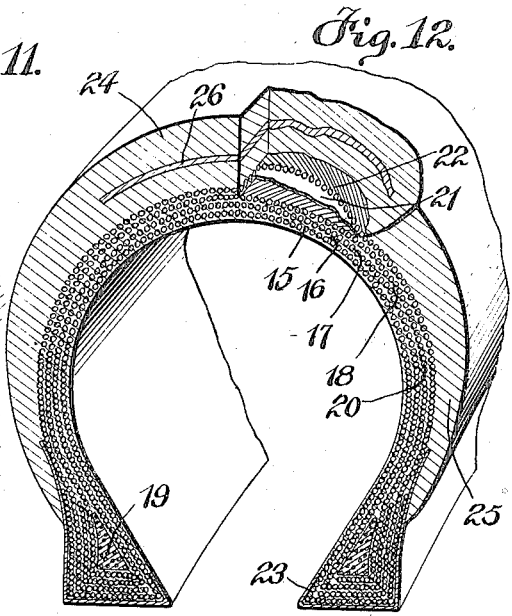
Fig. 12 is a sectional view illustrating the finished tire.

The locking ring is then removed to permit the removal of the various sections making up the core proper from the tire which is now completely built up. An air bag 27 is then positioned in the tire and inflated, after which the tire, with the inflated air bag still in it, is positioned in a mold, indicated at 28, in order that the tire may be cured in the usual manner. After curing, the tire and air bag are removed from the mold and the air bag is removed from the tire which, when finished, appears as clearly shown in Fig. 12 of the drawings.

The above method, if properly followed out, will insure construction of tires of great durability, particularly because of the numerous plies of fine cord employed and the manner in which the various plies are lapped about the beads. Ordinarily, cord tires are formed from relatively large and oftentimes tubular cords which must be flattened and twisted when applied to the core in order to have the tread portions of the strands engage each other. Such tires are liable to blow out as they usually have only two plies of cord and the cord is of such size that any weakness in any portion of a strand will cause a weak spot of relatively large area in the tire. A tire constructed in accordance with my above described method is not liable to this fault because of the fineness of the cord employed and the increased number of plies used. Other cord tires are built up of plies or strips of thread cloth merely laid and stretched upon the core, much after the fashion of fabric tires, the thread cloth consisting of parallel strands of cord loosely linked by widely spaced, very light strands of thread. Obviously, however, the tire cannot be as uniformly made with this type of cloth as the various plies cannot be as uniformly tensioned as is possible by my method in which a single cord is wound under tension about the core to form an entire ply.

It will of course be understood that the cord constituting the plies in the above described tire is frictioned or thoroughly impregnated with rubber prior to being wound about the core. It will further be understood that the frictioning plies interposed between the cord plies are merely plies of gum rubber which are relatively thin and which, during the curing or vulcanizing of the tire, flow into the spaces between the cords to friction the cord plies and bind them together, no appreciable gum ply being apparent between the cord plies and the finished tire.

Having thus described the invention, what is claimed as new is:

1. The method of building up a tire casing upon its core, which consists in winding a plurality of inner plies of cord helically about the core, one upon the other, each ply being wound at an angle of substantially 45° to the axis of the core and each ply being wound at an angle of substantially 90° to another adjacent ply, in positioning beads at the sides of the core and against the ply, in winding a further ply of cord about the partially built up tire, core and beads, in severing the convolutions of the cord of the last ply and folding the free end portions thereof inwardly about the outer faces of the beads and across the bases thereof to abut against the last ply wound previous to the placing of the beads, in severing the convolutions of the cord forming the last ply wound previous to the placing of the beads and folding the free ends of the strands forming such ply outwardly across the bases of the beads and upwardly along the outer side walls of the beads, and in then winding a further cord ply, severing it and folding its ends downwardly about the outer faces and inwardly across the bases of the beads, severing the outermost unsevered ply of those plies wound previous to the placing of the beads and folding the free ends of such ply outwardly against the bases and upwardly along the outer side walls of the beads and in continuing this operation until the first cord ply wound about the core has been severed and its ends folded about the beads.

2. The method of building up a cord tire casing upon its core, which consists in winding a ply of cord helically about the core at an angle of substantially 45° to the axis of the core, in winding a second cord ply over and at a reverse angle to the first ply, in placing beads against the sides of the second ply, in winding a third cord ply about the second ply and beads, in severing the convolutions of the third ply in spaced relation to each bead and folding the resultant free ends of the convolutions downwardly against the outer sides and inwardly across the bases of the beads, in severing the convolutions of the second cord ply along the inside of the core and midway between the beads and in folding the free ends of such convolutions outwardly across the bases and upwardly along the outer side walls of the beads, in winding a fourth cord ply about and at a reverse angle to the third cord ply, in severing the fourth cord ply and folding its ends in the manner followed with the third cord ply, and in severing the first cord ply and folding its ends about the beads in the manner followed in connection with the second cord ply.

3. The step in the building up of a tire casing about its core, which consists in winding a ply of cord helically about the core at an angle to the axis thereof, in positioning beads at the sides of the core and against the ply, in winding a further ply of cord helically about the core and beads and at an angle substantially reverse to the first, in severing the convolutions of the second cord ply and folding the free end portions thereof inwardly about the outer faces of the beads and across the bases thereof to abut against the first ply wound, in severing the convolutions of the cord forming the first ply wound, and in folding the free ends of the strands forming such ply outwardly across the bases of the beads and upwardly along the outer side walls of the beads.

In testimony whereof I affix my signature.

ROBERT M. MERRIMAN. [L. S.]